(12) United States Patent
Marpaung et al.

(10) Patent No.: US 10,174,606 B2
(45) Date of Patent: Jan. 8, 2019

(54) SYSTEM AND METHOD FOR CALIPER CALIBRATION

(71) Applicant: Schlumberger Technology Corporation, Sugar land, TX (US)

(72) Inventors: Sihar Marpaung, Issy les Moulineaux (FR); Jose Medina, Longjumeau (FR); Jean-Baptiste Cozon, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 687 days.

(21) Appl. No.: 14/645,364

(22) Filed: Mar. 11, 2015

(65) Prior Publication Data

US 2015/0267528 A1 Sep. 24, 2015

(30) Foreign Application Priority Data

Mar. 19, 2014 (EP) .................................... 14290072

(51) Int. Cl.
*E21B 47/08* (2012.01)
*G01B 7/13* (2006.01)
*G01B 21/02* (2006.01)
*G01B 21/04* (2006.01)

(52) U.S. Cl.
CPC ............... *E21B 47/08* (2013.01); *G01B 7/13* (2013.01); *G01B 21/02* (2013.01); *G01B 21/042* (2013.01); *G01B 2210/40* (2013.01)

(58) Field of Classification Search
CPC .... G01B 2210/40; G01B 7/13; G01B 21/042; E21B 47/08

USPC .......................................................... 73/1.81
See application file for complete search history.

(56) References Cited

U.S. PATENT DOCUMENTS

| 3,345,857 A | 10/1967 | Shutes et al. |
| 4,302,881 A | 12/1981 | Schwind et al. |
| 4,872,269 A * | 10/1989 | Sattmann ................. G01B 7/13 33/542 |
| 2014/0262340 A1* | 9/2014 | Beddoes ................. E21B 7/208 166/381 |

FOREIGN PATENT DOCUMENTS

| EP | 2647790 | 10/2013 |
| WO | 02/37052 | 5/2002 |

OTHER PUBLICATIONS

Expanded search report for the equivalent European patent application No. 14290072.9 dated Jul. 8, 2014.

* cited by examiner

*Primary Examiner* — R. A. Smith
*Assistant Examiner* — John M Royston
(74) *Attorney, Agent, or Firm* — Michael Dae (57) ABSTRACT

Embodiments of the present disclosure are directed toward a system and method to calibrate calipers of a downhole tool. Specifically, a calibration tool includes a substantially cylindrical calibration ring. The calibration tool also includes a finger coupled to the calibration ring. The finger is configured to engage with the downhole tool such that the calibration ring is mounted to the downhole tool and is coaxial with a tool axis of the downhole tool.

20 Claims, 5 Drawing Sheets

SYSTEM AND METHOD FOR CALIPER CALIBRATION

CROSS REFERENCE TO RELATED APPLICATIONS

This application claims the benefit of priority to European Patent Application 14290072.9, filed on Mar. 19, 2014, the entire contents of which is incorporated herein by reference.

BACKGROUND

The present disclosure relates generally to the field of downhole tools and, more particularly, to systems and methods for calibrating calipers on a downhole tool.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions.

A variety of downhole tools may be used to determine the properties of a geological formation surrounding a well. Some downhole tools may include calipers, which provide a measurement of the diameter of the wellbore at various depths. Caliper measurements are used in a variety of operations, including drilling, cementing, and evaluation of the geological formation. During drilling, for example, the caliper data can be used to monitor the wellbore condition (e.g., identifying possible wellbore washout and/or impending wellbore instability), thus allowing the driller to take remedial action. During well completion, the caliper data can be used to accurately evaluate the volume of cement to fill the casing annulus, as well as aiding in the selection of casing points. A reliable caliper may also be useful during logging to adjust formation evaluation measurements for wellbore size and to evaluate the quality of other logging while drilling (LWD) logs. The caliper measurements can also be used to plan services, such as dip meters or formation testers, that may be affected by unfavorable wellbore conditions.

A variety of tools have been developed to accurately calibrate calipers before the downhole tool enters the wellbore. The accuracy of the calibration directly affects the quality of the measurements received from the calipers. For example, an improperly calibrated caliper may return inaccurate data of the wellbore and create challenges for operators during and after drilling operations. In some cases, calipers are calibrated using a calibration tool with a known inner diameter. Such existing calibration tools are now known to have certain drawbacks. For example, existing calibration tools are often subject to gravitational effects that can hinder an accurate centralization of the calibration ring, thereby affecting the accuracy of the calibration may be compromised. It is now recognized that there is a need for more accurate tools for calibrating the calipers on downhole tools.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a calibration tool for calibrating calipers of a downhole tool includes a substantially cylindrical calibration ring and a finger coupled to the calibration ring. The finger is configured to engage with the downhole tool such that the calibration ring is mounted to the downhole tool and is coaxial with a tool axis of the downhole tool.

In a second embodiment, a calibration system includes a downhole tool. The downhole tool is configured to be disposed in a wellbore of a subterranean formation. The downhole tool includes at least one caliper. The caliper is configured to measure a distance between the downhole tool and the formation. The calibration system also includes a calibration tool designed to be disposed about the downhole tool. The calibration tool includes a substantially cylindrical calibration ring disposed around the downhole tool and a finger coupled to the calibration ring. The finger is configured to engage with the downhole tool such that the calibration ring is mounted to the downhole tool and is coaxial with a tool axis of the downhole tool.

In a third embodiment, a method includes disposing a first calibration tool over a downhole tool. The calibration tool includes a substantially cylindrical calibration ring having an inner diameter and a finger coupled to the calibration ring. The method also includes coupling the calibration tool to the downhole tool using the finger of the calibration tool. The finger is configured to engage the downhole tool such that the calibration ring is coaxial with a tool axis of the downhole tool. The method further includes actuating at least one caliper of the drill string to contact an inner circumference of the calibration tool.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended just to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are just examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed to a system and method for calibrating calipers on a downhole tool. In certain embodiments, the downhole tool includes a caliper that may be used to measure the diameter of a wellbore. Before being inserted in the wellbore, the calipers may be calibrated using a calibration tool. Rather than calibrate the downhole tool using a pad pressure exerted by the calipers, in presently disclosed embodiments, the calibration tool may enable calibration of the calipers without utilizing pad pressure from the calipers to support the weight of the calibration tool. Moreover, the calibration tool may be aligned with a tool axis of the downhole tool without activation of the calipers. To that end, the calibration tool may include fingers that are designed to engage with the downhole tool. In other words, the fingers may couple to the downhole tool to support and center the calibration tool about the tool axis. After the calibration tool is coupled to the downhole tool, the caliper can be actuated to contact the inner circumference of the calibration tool. The inner circumference of the calibration tool can serve as a reference point for measurements obtained when the downhole tool is lowered into the wellbore. By centering the calibration tool about the downhole tool via the fingers, misalignment due to supporting the calibration tool with caliper pad pressure or gravitational effects may be reduced. Moreover, the calibration tool may be used on downhole tools where the calipers do not exert sufficient pad pressure to support the calibration tool. As a result, the accuracy of caliper calibration may be improved, as compared to caliper calibration performed by calibration tools that use pad pressure.

Figure 1:
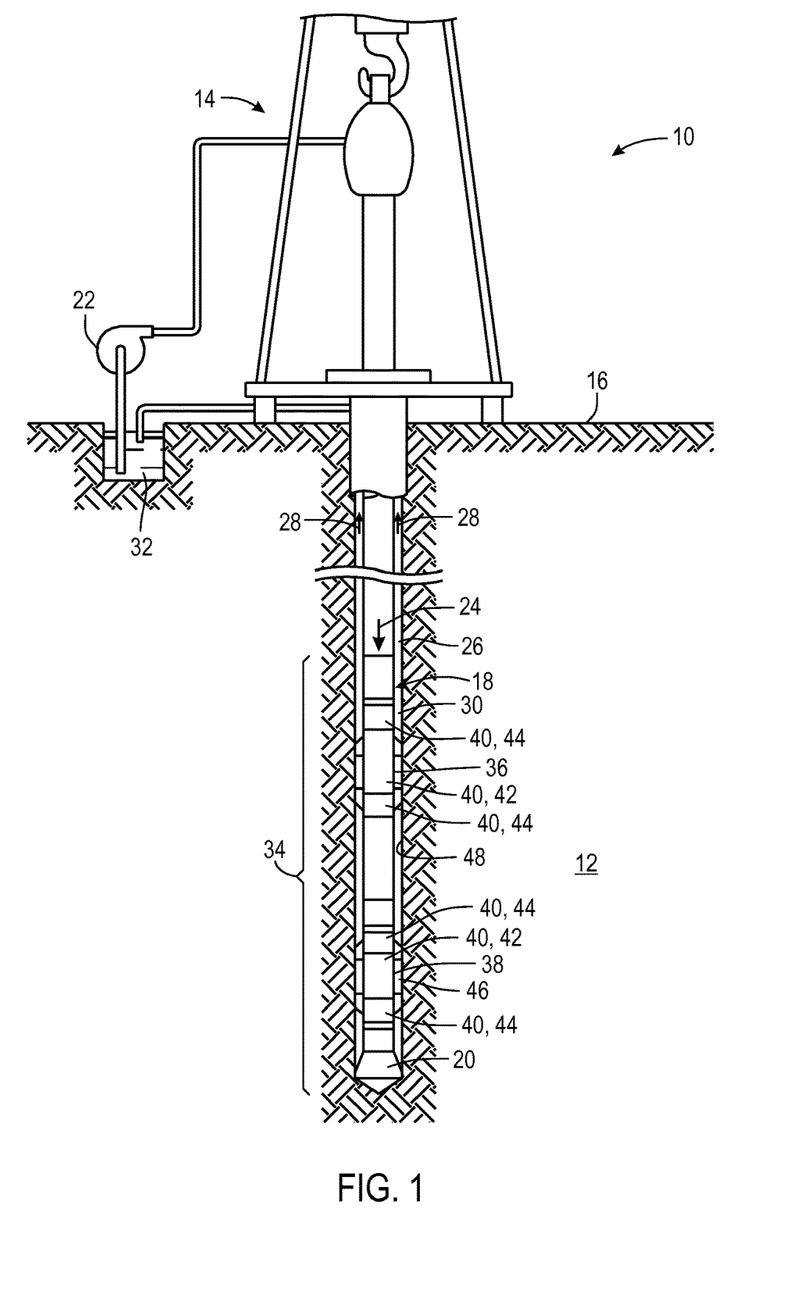
FIG. 1 is a partial cross sectional view of an embodiment of a drilling system used to drill a well through subsurface formations, in accordance with the present techniques.

FIG. 1 illustrates a drilling system 10 used to drill a well through subsurface (e.g., subterranean) formations 12. A drilling rig 14 at the surface 16 is used to rotate a drill string 18 that includes a drill bit 20 at its lower end. As the drill bit 20 is rotated, a "mud" pump 22 is used to pump drilling fluid, referred to as "mud" or "drilling mud," downward through the drill string 18 in the direction of an arrow 24 to the drill bit 20. The mud, which is used to cool and lubricate the drill bit 20, exits the drill string 18 through ports (not shown) in the drill bit 20. The mud then carries drill cuttings away from the bottom of the wellbore 26 as it flows back to the surface 16, as shown by arrows 28, through an annulus 30 between the drill string 18 and the formation 12. At the surface 16, the return mud is filtered and conveyed back to a mud pit 32 for reuse.

As illustrated in FIG. 1, the lower end of the drill string 18 includes a bottom-hole assembly ("BHA") 34 that includes the drill bit 20, as well as a plurality of drill collars 36, 38 that may include various instruments and downhole tools 40 such as sample-while-drilling ("SWD") tools that include sensors, telemetry equipment, pumps, sample chambers, and so forth. For example, the drill collars 36, 38 may include logging-while-drilling ("LWD") modules 42 and/or measurement-while-drilling ("MWD") modules 44. The LWD modules 42 of FIG. 1 are each housed in a special type of drill collar 36, 38, and each contain any number of logging tools and/or fluid sampling devices. The LWD modules 42 include capabilities for measuring, processing and/or storing information, as well as for communicating with the MWD modules 44 and/or directly with the surface equipment such as a logging and control computer. While the downhole tools 40 are generally illustrated as part of a drill string 18 in FIG. 1, in other embodiments the downhole tool 40 may be used in the context of wireline, tractor, coiled tubing, or any other desirable downhole exploration systems.

Present embodiments of the downhole tools 40 may also include calipers 46 used to measure a distance between the downhole tool 40 and the subsurface formation 12. For example, the calipers 46 may include pads that extend out from the downhole tool 40 to contact a wellbore wall 48 of the wellbore 26. The calipers 46 may include electronics to continually obtain and transmit information about the diameter of the wellbore 26 based on the distance of the extended caliper pads.

As described in detail below, the calipers 46 of the downhole tool 40 may be calibrated with a calibration system. The calibration system may include a calibration tool that engages with and is supported by the downhole tool 40 to calibrate the calipers 46 before the downhole tool 40 is lowered into the wellbore 26. The calibration tool may provide reference points for known circumferences used to determine an accurate measurement of a position of the calipers 46. That is, the electronics may associate a detected position of the calipers 46 with a certain diameter and/or radius of the wellbore 26. Based on the calibration of the calipers 46, an equation (e.g., linear, quadratic, etc.) may be computed to determine an accurate diameter of the wellbore 26 based on the detected position of the calipers 46 relative to the downhole tool 40. In this manner, a relatively accurate wellbore 26 profile may be achieved by using the calipers 46 after they are calibrated.

Figure 2:
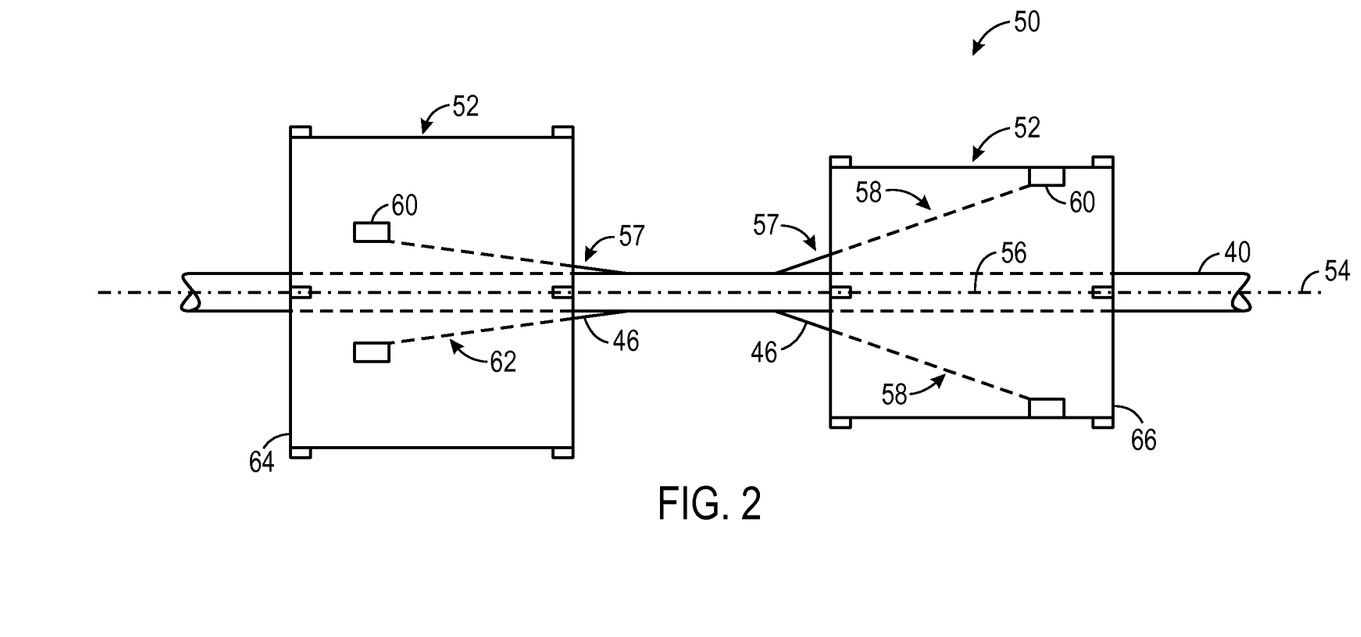
FIG. 2 is a schematic side view of an embodiment of a calibration system used to calibrate calipers of a downhole tool, in accordance with the present techniques.

Present embodiments include a calibration system 50 for calibrating the calipers 46 as illustrated in FIG. 2. As shown, the calibration system 50 includes at least one calibration tool 52 disposed about the downhole tool 40. The downhole tool 40 generally extends along a tool axis 54, and the calibration tool 52 is centered about the tool axis 54. That is, a calibration tool axis 56 of the calibration tool 52 and the tool axis 54 of the downhole tool 40 are aligned. In this way, the calibration tool 52 and the downhole tool 40 are coaxial when the calibration tool 52 engages with the downhole tool 40. The calibration tool 52 is positioned about the downhole tool 40 such that the calipers 46 are also disposed within the calibration tool 52. In the illustrated embodiment, the downhole tool 40 has two sets 57 of calipers 46. Each set 57 may include any desirable number of calipers 46, which may be arranged circumferentially about the tool axis 54. For example, the two sets 57 may include eight calipers 46 (just four shown). While the depicted embodiment shows a total of four calipers 46 (two in each set 57), it is understood that the downhole tool 40 may have any number of calipers 46 depending on specifications of the drilling operation. Moreover, the different sets 57 of calipers 46 may not be aligned with one another along the downhole tool 40 in some embodiments. For example, the two sets 57 of calipers 46 may be offset from one another circumferentially about the tool axis 54 (e.g., 45 degrees).

In some embodiments, the calipers 46 may be actuated (e.g., opened, moved radially out from the downhole tool, moved away from the downhole tool) into an open position 58. In the open position 58, pads 60 of the calipers 46 are brought into contact with the inner circumference of the calibration tool 52. In contrast, the pads 60 do not contact the inner circumference of the calibration tool 52 when in a closed position 62. It is understood that while the depicted embodiment illustrates one set 57 of four calipers 46 (just two shown) in the open position 58, the two sets 57 of four calipers 46 may be actuated such that they are in the open position 58 at the same time. Furthermore, in some embodiments, each of the calipers 46 in a set 57 may be actuated into the open position 58 at the same time. Moreover, in some embodiments, certain calipers 46 in the set 57 may be actuated into the open position 58 at the same time while the other calipers 46 in the set 57 are not actuated into the open position 58. In other embodiments, however, each of the calipers 46 in a set 57 may be individually actuated into the open position 58. For example, one of the calipers 46 may be actuated into the open position 58 while the other calipers 46 are not. That is, the calipers 46 may be separately actuated into the open position 58, as well as actuated into the open position 58 together.

As previously mentioned, the calibration system 50 may be used to calibrate the calipers 46 before the downhole tool 40 is placed in the wellbore 26. That is, a first calibration tool 64 may be placed about the downhole tool 40 prior to the actuation of the calipers 46. Once the first calibration tool 64 is in place, the calipers 46 may be moved to the open position 58 to contact the inner circumference of the first calibration tool 64. The position of the calipers 46 along the known inner circumference of the first calibration tool 64 may be used as a reference point. In some embodiments, a second calibration tool 66 may be placed about the same set 57 of calipers 46 and the calipers 46 may be moved to the open position 58 to contact the inner circumference of the second calibration tool 66. This second position of the calipers 46 along the known inner circumference of the second calibration tool 66 may be taken as a second reference point. The two reference points may then be used to develop a relationship (e.g., linear equations, quadratic equations, gain, offset, etc.) between the position of the calipers 46 and the inner circumference the calipers 46 are contacting. In this manner, the calipers 46 may be calibrated relative to the known inner circumferences of the first calibration tool 64 and the second calibration tool 66 before being lowered into the wellbore 26. In the depicted embodiment, the inner diameter of the first calibration tool 64 is different than the inner diameter of the second calibration tool 66. It should be noted that any desirable number of reference points may be taken using 2, 3, 4, 5, or more calibration tools 52.

Figure 3:
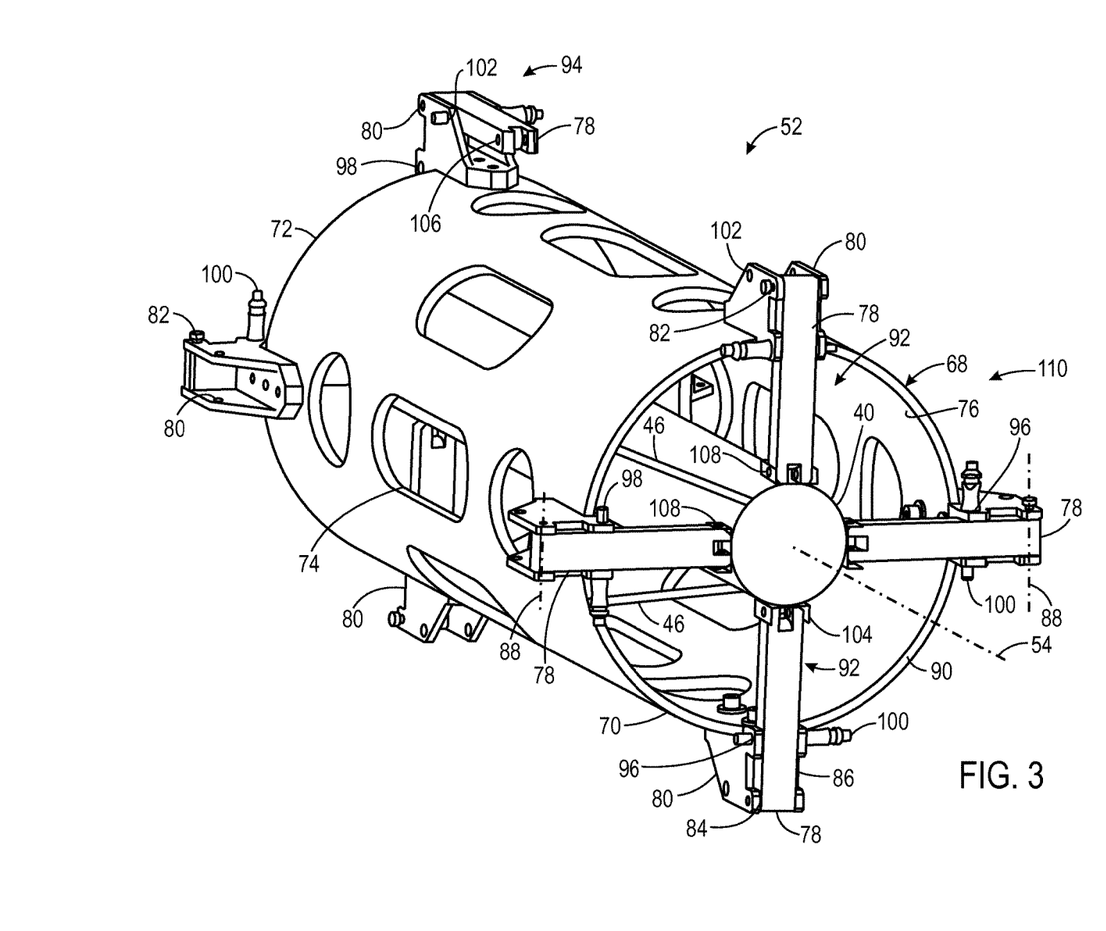
FIG. 3 is a perspective view of an embodiment of a calibration tool engaged with a downhole tool, in accordance with the present techniques.

Having now described how the calibration tool 52 may be used to calibrate the calipers 46 of the downhole tool 40, a more detailed discussion of the calibration tool 52 is provided. FIG. 3 is a perspective view an embodiment of the calibration tool 52 engaging with the downhole tool 40. The calibration tool 52 includes a substantially cylindrical calibration ring 68. That is, the calibration ring 68 is cylindrically shaped within machining tolerances. In other embodiments, the calibration ring 68 may have any desirable shape that, when axially centered about the tool axis 54, is the same distance from the downhole tool 40 in the directions of the calipers 46. The calibration ring 68 has an elongated body with a first end 70 and a second end 72. The calibration ring 68 may be at least long enough to cover the pads 60 of the calipers 46. In other words, the calibration ring 68 may be long enough to engage the full length of the pads 60 when the calipers 46 are actuated into the open position 58. Additionally, the calibration ring 68 may have apertures 74 disposed along the elongated body of the calibration ring 68. These apertures 74 may enable an operator working with the calibration ring 68 to ensure proper alignment of the pads 60 with an inner circumference 76 of the calibration ring 68. For example, the operator may be able to look through the apertures 74 and see the calipers 46 within the calibration tool 52. By being able to see the calipers 46, the operator may be able to position the calibration tool 52 in a manner that ensures the pads 60 of the calipers 46 contact the calibration ring 68 when moved to the open position 58. In addition, the apertures may reduce the overall weight of the calibration tool 52.

In the illustrated embodiment, the calibration tool 52 is equipped with fingers 78 coupled to the calibration ring 68 at the first end 70 and the second end 72. While the embodiment shows a plurality of four fingers 78 on the first end 70, it is understood that more or fewer fingers 78 may be used. For example, the calibration tool 52 may have six fingers 78 (e.g., three on the first end 70 and three on the second end 72). In the illustrated embodiment, the fingers 78 on the first end 70 and the second end 72 are substantially aligned with each other circumferentially about the tool axis 54. However, in other embodiments, the fingers 78 on the first end 70 may not be aligned with the fingers 78 on the second end 72. For example, other tools disposed on or coupled with the downhole tool 40 may inhibit circumferential alignment of each of the fingers 78. The fingers 78 are coupled to the calibration tool 52 by finger mounts 80. The finger mounts 80 may be mounting brackets rigidly coupled to the calibration ring 68. As will be appreciated, there may be at least as many finger mounts 80 as there are fingers 78.

To secure the fingers 78, the finger mounts 80 include several holes in the illustrated embodiment. For example, each of the fingers 78 may be rotatably coupled to the corresponding finger mount 80 at a finger coupling hole 82. The finger coupling hole 82 may extend through the finger mount 80 and be aligned with a corresponding mounting hole 84 of the finger 78 when the finger 78 is in a finger slot 86. The finger coupling hole 82 has a finger axis 88 running through it. The finger axis 88 is substantially perpendicular (e.g., plus or minus approximately five degrees) to the tool axis 54. A bolt, pin, or other fastener may be inserted through the finger coupling hole 82 and the mounting hole 84 to couple the finger 78 to the finger mount 80.

In some embodiments, the fingers 78 are rotatably coupled to the finger mounts 80 such that they are able to rotate about the finger axis 88. In some embodiments, the fingers 78 may be configured to rotate approximately 270 degrees about the finger axis 88. That is, the fingers 78 may rotate about the finger axis 88 between a position where the fingers 78 contact the elongated body of the calibration ring 68 and a position where the fingers contact a face 90 of the first end 70 or the second end 72. However, in some embodiments stopping mechanisms may be included in the finger mounts 80 to hinder rotation of the fingers 78 past a designated point.

Rotation of the fingers 78 about the finger axis 88 enables the fingers 78 to transition between a first position 92 and a second position 94. In the first position 92, the fingers 78 are engaged with the downhole tool 40. In other words, the fingers 78 extend radially inward toward the tool axis 54 and are substantially perpendicular (e.g., within approximately 10 degrees) to the tool axis 54 when in the first position 92. Additionally, the finger 78 may include a latching hole 96 that is aligned with a first position coupling hole 98 of the finger mount 80 when the finger 78 is in the first position 92. As shown in the depicted embodiment, the first position coupling hole 98 is positioned radially inward toward the tool axis 54 relative to the finger coupling hole 82, and is configured to align with the latching hole 96 when the finger 78 is in the first position 92. The spacing of the first position coupling hole 98 may be designed to ensure that the finger 78 is not secured into the first position 92 prematurely. That is, the first position coupling hole 98 may be positioned on the finger mount 80 to prevent alignment with the latching hole 96 when the finger 78 is not in the first position 92. A finger locking mechanism 100 (e.g., a pin, bolt, or other fastener configured to secure an object in place) may be inserted through the latching hole 96 and first position coupling hole 98 to secure the finger 78 to the finger mount 80 when the finger 78 is in the first position 92. However, other mechanisms may be used to secure the finger 78 to the finger mount 80. For example, the finger mount 80 may have a slot or notch formed in the side that aligns with a peg on the finger 78 when the finger 78 is in the first position 92.

Returning to the rotation of the fingers 78 about the finger axis 88, the finger 78 is in the second position 94 when the fingers 78 are not engaged with the downhole tool 40. In the second position 94, the fingers 78 may be substantially parallel (e.g., plus or minus approximately 5 degrees) to the tool axis 54. In some embodiments, the second position 94 may be any position where the fingers 78 do not extend inward toward the tool axis 54. Moreover, a second position coupling hole 102 of the finger mount 80 may align with the latching hole 96 of the finger 78 when the finger 78 is in the second position 94. As shown in the depicted embodiment, the second position coupling hole 102 is laterally disposed from the finger coupling hole 82 in a direction substantially parallel to the tool axis 54. The spacing of the second position coupling hole 102 may be designed to ensure that the finger 78 is not secured into the second position 94 prematurely. That is, the second position coupling hole 102 may be positioned on the finger mount 80 to prevent alignment with the latching hole 96 when the finger 78 is not in the second position 94. The finger locking mechanism 100 may be inserted through the latching hole 96 and second position coupling hole 102 to secure the finger 78 to the finger mount 80 when the finger 78 is in the second position 94. However, other mechanisms may be used to secure the finger 78 to the finger mount 80. For example, the finger mount 80 may have a slot or notch formed in the side that aligns with a peg on the finger 78 when the finger 78 is in the second position 94. In some embodiments, the second position 94 may be used when storing the calibration tool 52, moving the calibration tool 52 between different measurement positions, and/or inserting the calibration tool 52 over an end of the downhole tool 40.

As previously mentioned, the fingers 78 are configured to engage the downhole tool 40 when in the first position 92. To that end, the downhole tool 40 may include an engagement feature 104 configured to receive the finger 78. In other words, the finger 78 and the downhole tool 40 are configured to be coupled together via the engagement feature 104. In some embodiments, the engagement feature 104 may utilize a finger locking mechanism (e.g., similar to the finger locking mechanism 100 described above) to secure the finger 78 to the engagement feature 104. For example, in the disclosed embodiment, the finger 78 includes a locking hole 106 that aligns with a securing hole 108 of the engagement feature 104 when the finger 78 is in the first position 92. As mentioned above, the finger locking mechanism 100 may be inserted through the locking hole 106 and the securing hole 108 to couple the finger 78 to the engagement feature 104. However, in other embodiments, the structure of the engagement feature 104 may secure the finger 78 in place. For example, the engagement feature 104 may include a groove, a slot, or indentation configured to receive a complementary feature of the finger 78. Or, the engagement feature 104 may include a compressible stop that may be compressed into the downhole tool 40 while the finger 78 is moving into the first position 92 and returned to its original position to secure the finger 78 into the first position 92 once the finger 78 passes over the compressible stop. It is understood that a variety of techniques may be used to securely enable the finger 78 to engage with the engagement feature 104. By securing the fingers 78 to the engagement feature 104, the calibration ring 68 may be fully supported by the fingers 78. That is, the weight of the calibration tool 52 may be supported by the fingers 78 and not rely on a pad pressure from the calipers 46. Additionally, by engaging with the downhole tool 40, the calibration tool 52 can be aligned along the tool axis 54 when using fingers 78 with equal lengths.

As described above, each finger 78 is configured to engage with an engagement feature 104 of the downhole tool 40. In some embodiments, each of the engagement features 104 of the downhole tool 40 may correspond interchangeably with each finger 78 of the calibration tool 52. However, in other embodiments, specific fingers 78 of the calibration tool 52 may align with specific engagement features 104 of the downhole tool 40, in order to ensure proper placement of the calibration tool 52. Moreover, the engagement features 104 may be designed to fit fingers 78 of multiple calibration tools 52 having different inner diameters. For example, the fingers 78 of the first calibration tool 64 and the fingers 78 of the second calibration tool 66 illustrated in FIG. 2 may be designed to engage with the same engagement features 104. Like the fingers 78, the engagement features 104 are arranged circumferentially about the downhole tool 40. The spacing of the engagement features 104 may be dependent on a variety of design conditions. For example, the engagement features 104 may be arranged to avoid interference with other equipment on or coupled to the downhole tool 40. Additionally, the engagement features 104 may be installed at specific locations to enable the pads to contact the inner circumference 76 of the calibration tool 52. As will be appreciated, the locations of the engagement features 104 may correspond to the locations of the fingers 78.

Figure 4:
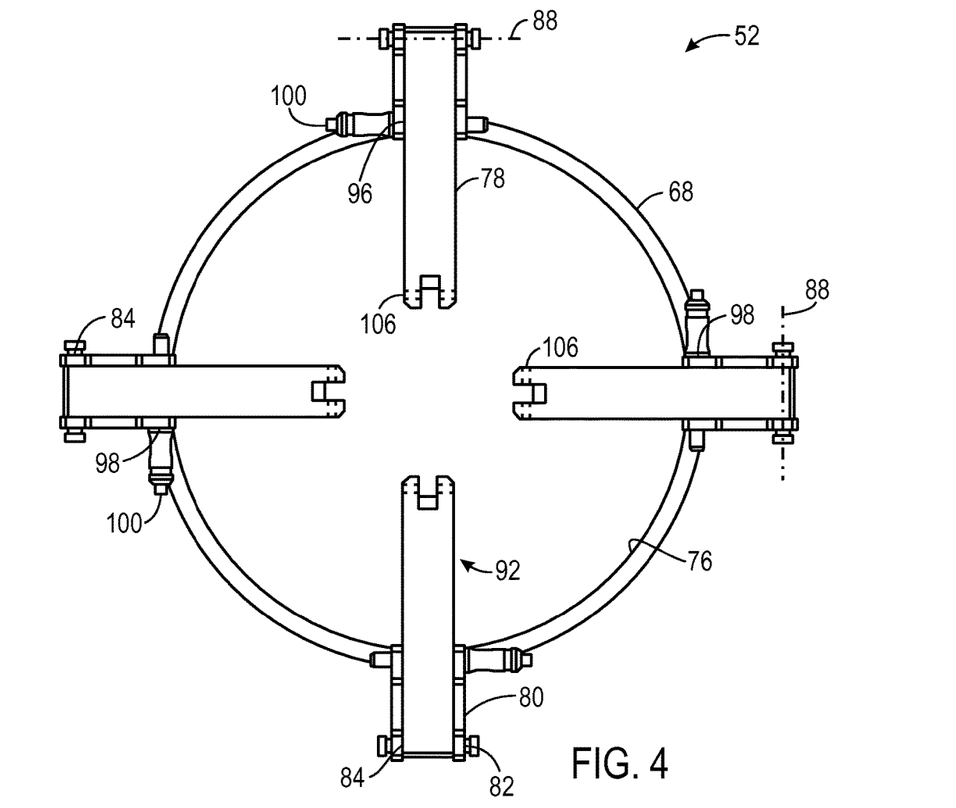
FIG. 4 is a front view of an embodiment of a calibration tool for calibrating calipers of a downhole tool, in accordance with the present techniques.

The fingers 78 enable the alignment of the tool axis 54 with the calibration tool axis 56 without using pad pressure from the calipers 46 to support the weight of the calibration tool 52. That is, the fingers 78 are able to support the calibration ring 68 in alignment with the tool axis 53 even when the calipers 46 are not actuated into the open position 58. Turning to FIG. 4, a front view of an embodiment of the calibration tool 52 is shown. As previously mentioned, the fingers 78 are coupled to the calibration ring 68 by finger mounts 80. In the depicted embodiment, the fingers 78 are circumferentially spaced equally about the calibration ring 68. However, the fingers 78 may not be equally spaced in other embodiments. For example, more fingers 78 may be placed on the upper half 110 of the calibration ring 68 to support the weight of the calibration tool 52 when the calibration tool 52 is mounted to the downhole tool 40.

Figure 5:
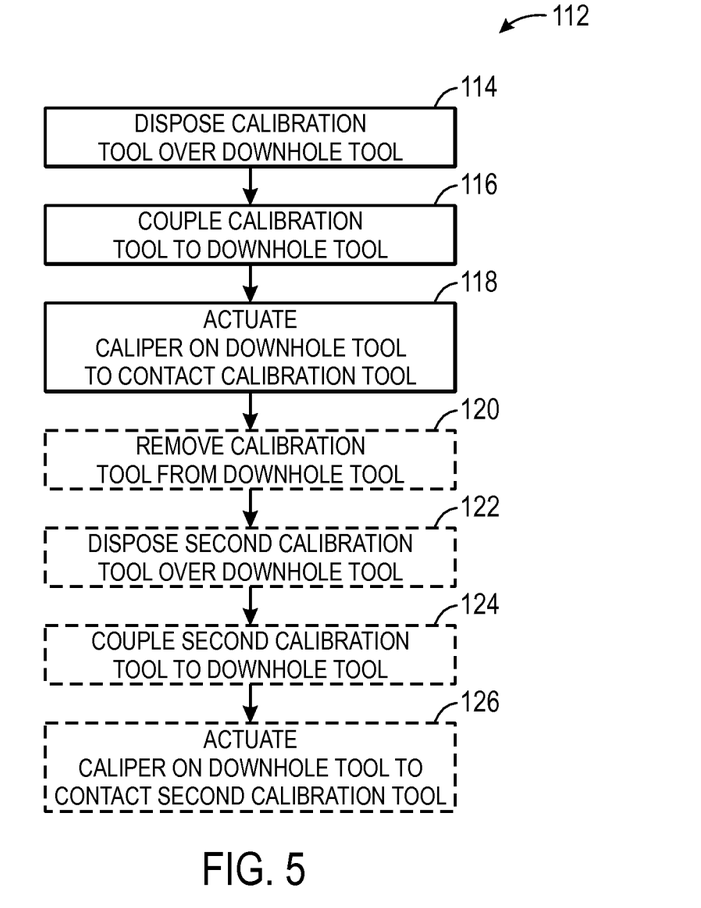
FIG. 5 is a process flow diagram of an embodiment of a method for calibrating calipers of a downhole tool using a calibration tool, in accordance with the present techniques.

A process flow diagram of an embodiment of a method 112 for calibrating calipers 46 on the downhole tool 40 is shown in FIG. 5. The method 112 includes disposing (block 114) the first calibration tool 64 over the downhole tool 40. The method 112 also includes coupling (block 116) the first calibration tool 64 to the downhole tool 40. This may involve engaging one or more fingers 78 with the engagement features 104 to couple the first calibration tool 64 to the downhole tool 40. The first calibration tool 64 and downhole tool 40 are coaxial about the tool axis 54 when the finger 78 engages with the engagement feature 104. In other words, the first calibration tool 64 is aligned with the tool axis 54 of the downhole tool 40 when the calibration ring 68 is mounted to the downhole tool 40. In addition, the method 112 includes actuating (block 118) the caliper 46 to contact an inner circumference of the first calibration tool 64. As a result, the position of the caliper 46 relative to the downhole tool 40 may be known for a given circumference.

To obtain another set of calibration data for an additional calibration tool 52, the first calibration tool 64 may be removed (block 120) from the downhole tool 40. Then, the second calibration tool 66 may be disposed (block 122) over the downhole tool 40. Similarly to the first calibration tool 64, the second calibration tool 66 may be coupled (block 124) to the downhole tool 40 using one or more fingers 78. The fingers 78 may engage with the downhole tool 40 and coaxially align the downhole tool 40 and the second calibration tool 66. In addition, the method 112 may include actuating (block 126) the caliper 46 to contact an inner circumference of the second calibration tool 66. The second reference point obtained may be combined with the reference point obtained utilizing the method 112 to compute and extrapolate a calibration equation for future downhole measurements.

As discussed in detail above, the disclosed embodiments include the calibration system 50 for calibrating calipers 46 on the downhole tool 40. Specifically, the calibration system 50 includes the calibration tool 52, which is configured to engage with the downhole tool 40 via fingers 78. In this manner, the calibration tool 52 and the downhole tool 40 may be aligned about the tool axis 54 with the fingers 78 supporting the weight of the calibration tool 52. Thereafter, the calipers 46 of the downhole tool 40 can be actuated to contact the inner diameter of the calibration tool 52. The position of the calipers 46 can be recorded with the known inner circumference 76, generating a reference point for future measurements when the downhole tool 40 is lowered into the wellbore. A number of calibration tools 52 with different inner circumferences 76 may be utilized to generate a function of caliper position compared to diameter.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A calibration tool for calibrating calipers of a downhole tool, comprising:
   a substantially cylindrical calibration ring configured to cover pads of the calipers; and
   at least a finger coupled to the calibration ring and configured to engage with the downhole tool such that the calibration ring is mounted to the downhole tool and is coaxial with a tool axis of the downhole tool and the pads of the calipers are inside of the calibration ring.

2. The calibration tool of claim 1, comprising a plurality of fingers circumferentially spaced about the calibration ring.

3. The calibration tool of claim 1, wherein the finger is rotatably coupled to the calibration ring and configured to rotate about a finger axis between a first position and a second position, wherein the finger is configured to engage with the downhole tool in the first position and not in the second position.

4. The calibration tool of claim 3, wherein the finger axis is substantially perpendicular to the tool axis.

5. The calibration tool of claim 3, wherein the finger extends radially inward toward the tool axis when in the first position and is substantially parallel to the tool axis when in the second position.

6. The calibration tool of claim 3, comprising a finger holding mechanism configured to selectively hold the fingers in the first position or in the second position.

7. The calibration tool of claim 1, comprising a first finger positioned on a first end of the calibration ring and a second finger positioned on a second end of the calibration ring, wherein the first and second fingers are configured to engage with the downhole tool such that the calibration ring is mounted to the downhole tool and is coaxial with a tool axis of the downhole tool.

8. The calibration tool of claim 7, wherein the first finger and the second finger are substantially aligned circumferentially about the tool axis.

9. A calibration system, comprising:
   a downhole tool configured to be disposed in a wellbore of a subterranean formation, wherein the downhole tool comprises at least one caliper configured to measure a distance between the downhole tool and the formation; and
   a calibration tool disposed about the downhole tool, wherein the calibration tool is according to claim 1.

10. The calibration system of claim 9, wherein the downhole tool further comprises an engagement feature, wherein the finger is configured to engage with the downhole tool via the engagement feature.

11. The calibration system of claim 10, wherein the engagement feature comprises a pin connection.

12. The calibration system of claim 9, wherein the at least one caliper is configured to contact an inner circumference of the calibration ring when the at least one caliper is in an open position.

13. The calibration system of claim 9, comprising two calibration tools, wherein each of the calibration tools comprises a substantially cylindrical calibration ring disposed over the downhole tool, wherein the calibration rings of the two calibration tools comprise different inner diameters.

14. The calibration system of claim 9, wherein the calibration tool is configured to mount the calibration ring to the downhole tool such that the calibration ring is coaxial with the tool axis prior to actuation of the at least one caliper into an open position.

15. The calibration system of claim 9, wherein the downhole tool comprises multiple calipers, and wherein each of the multiple calipers is configured to be separately actuated into an open position away from the downhole tool.

16. A method for calibrating calipers on a downhole tool, comprising:
   disposing a first calibration tool over the downhole tool, wherein the first calibration tool is according to claim 1;
   coupling the first calibration tool to the downhole tool using the finger of the first calibration tool, the finger being configured to engage the downhole tool in the first position such that the calibration ring is coaxial with a tool axis of the downhole tool; and
   actuating at least one caliper of the downhole tool into an open position to contact a first inner circumference of the first calibration tool.

17. The method of claim 16, further comprising:
   removing the first calibration tool from the downhole tool;
   disposing a second calibration tool over the downhole tool, wherein the second calibration tool is according to claim 1;
   coupling the second calibration tool to the downhole tool using the second finger of the second calibration tool, the second finger being configured to engage the downhole tool in the first position such that the calibration ring is coaxial with the tool axis of the downhole tool; and
   actuating at least one caliper of the downhole tool into an open position to contact a second inner circumference of the second calibration tool.

18. The method of claim 17, wherein the first inner diameter of the first calibration tool is different than the second inner diameter of the second calibration tool.

19. The method of claim 17, wherein the finger of the first calibration tool and the second finger of the second calibration tool are each configured to engage the downhole tool via a single engagement feature disposed on the downhole tool.

20. The method of claim 16, wherein the finger of the first calibration tool is configured to mount the calibration ring to the downhole tool such that the calibration ring is coaxial with the tool axis prior to actuation of the at least one caliper into an open position.

* * * * *